United States Patent
Pritchard et al.

(10) Patent No.: US 9,609,125 B2
(45) Date of Patent: Mar. 28, 2017

(54) CONTROL OF TELECOMMUNICATIONS SYSTEM

(75) Inventors: Simon Jeremy Pritchard, Guildford (GB); Richard Andrew Beauchamp, High Wycombe (GB); Sanjay Rugnath Vadgama, Middlesex (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 329 days.

(21) Appl. No.: 14/128,850

(22) PCT Filed: Apr. 27, 2012

(86) PCT No.: PCT/GB2012/000394
§ 371 (c)(1),
(2), (4) Date: Dec. 23, 2013

(87) PCT Pub. No.: WO2012/175906
PCT Pub. Date: Dec. 27, 2012

(65) Prior Publication Data
US 2014/0133363 A1    May 15, 2014

(30) Foreign Application Priority Data
Jun. 23, 2011 (EP) .................... 11250605

(51) Int. Cl.
*H04M 3/46* (2006.01)
*H04M 3/436* (2006.01)
*H04M 3/523* (2006.01)

(52) U.S. Cl.
CPC ........... *H04M 3/465* (2013.01); *H04M 3/46* (2013.01); *H04M 3/436* (2013.01); *H04M 3/5232* (2013.01)

(58) Field of Classification Search
None
See application file for complete search history.

(56) References Cited

U.S. PATENT DOCUMENTS

| 2006/0062374 A1 | 3/2006 | Gupta |
| 2006/0153356 A1 | 7/2006 | Sisselman et al. |

(Continued)

FOREIGN PATENT DOCUMENTS

| DE | 38 07 006 | 9/1989 |
| EP | 0 740 450 | 10/1996 |

(Continued)

OTHER PUBLICATIONS

International Search Report for PCT/GB2012/000394, mailed Jun. 6, 2012.

*Primary Examiner* — Rhonda Murphy
(74) *Attorney, Agent, or Firm* — Nixon & Vanderhye P.C.

(57) ABSTRACT

A telecommunications server (2) controlling a plurality of telecommunications terminals (4) connected to a packet switched telecommunications system (40, 41), responds to call events (20) by transmitting an alert (251, 252) to each of the terminals. If the server is not capable of processing all the required event alerts in parallel, it processes the event alerts to the terminals in a predetermined sequence, according to stored prioritization rules (60). The priority accorded to an individual terminal may be set according to the alert mode (visual-only, or audible) currently set for that terminal (or the user currently using the terminal) for that call type or calling party.

11 Claims, 4 Drawing Sheets

(56) References Cited

U.S. PATENT DOCUMENTS

2008/0152111 A1  6/2008  Mock et al.
2015/0074249 A1* 3/2015  Connelly et al. ............. 709/220

FOREIGN PATENT DOCUMENTS

| EP | 1 521 440 | 4/2005 |
| EP | 1 679 864 | 7/2006 |
| EP | 2 048 863 | 4/2009 |
| WO | WO 98/56156 | 12/1998 |
| WO | 99/60766 | 11/1999 |
| WO | WO 2008/071553 | 6/2008 |

* cited by examiner

CONTROL OF TELECOMMUNICATIONS SYSTEM

This application is the U.S. national phase of International Application No. PCT/GB2012/000394, filed 27 Apr. 2012, which designated the U.S. and claims priority to EP Application No. 11250605.0, filed 23 Jun. 2011, the entire contents of each of which are hereby incorporated by reference.

BACKGROUND AND SUMMARY

This invention relates to the control of telecommunications systems, and in particular of IP-based local networks for use in call centres, trading rooms and other applications. In systems designed for use in trading rooms of the trading financial services industry, it is common practice to provide a telecommunications terminal or "turret" for each user. Such networks provide a call server which handles incoming and outgoing call requests, and routes calls to the turrets appropriately.

Individual terminals are notified of changes of state of a Trunk or DDI (direct dial in telephone extension) in response to many kinds of call events, such as users going "on-hook" or "off-hook". This specification will mainly discuss notifications made in response to incoming call attempts, but this is not intended to be limitative. When a call event occurs, the call server transmits alerts to any terminal to which the call is appropriate—depending on the type of call, this may be only one terminal—selected according to the dialled number, or the calling party, together with any call diversion settings or other user settings in force, as is described for example in United States Patent Application US2006153356 (Sisselman) and European Patent Application EP0740450 (IBM). However, in many cases the alert is sent to several, or even all, terminals connected to the server, as is described in International Patent Application WO20081071553 (Nokia). The way the system alerts the terminal may be selected by the user, as is described for example in German Patent specification DE3807006 (Telenorma).

In a system that is to operate in a converged network environment it is necessary to be able to measure the performance of the system in delivering call event notifications across many underlying network architectures, and also to predict its future performance. The overall performance of the system will be limited by the characteristics of the underlying network.

The telephony environment within a trading room has emphasis on team working. Users need to share the same Trunks or DDIs between several colleagues. Typically tens, but sometimes hundreds of terminals share the same Trunk/DDI. This sharing allows the users to see the activity of others on their telephony devices and provides fast access to allow them to dynamically join and create conferences. The users are commonly co-located. Prior art approaches, such as those described in European Patent Applications EP1521440 (AT&T) and EP2048863 (Ascendent) allow the selection of "sequential" ringing, in which a call event alert is routed to several termination points in turn, one at a time, in a sequence determined by the user, the call attempt being forwarded from each termination to the next if it is not answered within a predetermined period. Some systems, such as the AT&T system referenced above, also permit "parallel" ringing, in which a call attempt is routed to several termination points simultaneously. However, in the latter case, it is not possible to arrange for call alerts to be perfectly synchronised, because a typical digital processor performs operations in a sequence of steps, rather than strictly simultaneously. In a large installation, the time elapsed between the first and last alert can be significant, or the order of a second or two. It is very important that the notification of incoming call alerts and other state change events to all these terminals occur in a manner which maintains a democracy of service such that there is no perceptible delay when viewing the terminals. In very active or competitive environments this puts those who are not alerted to an incoming call first at a disadvantage, as they will have less opportunity to answer the call.

The fairness of call event notification delivery to endpoint devices is determined by several factors, such as the software architecture of the central call control server, the network topology, the network latency, any variation in packet delay, and end to end availability of multicast across the network and multicast replication delays The software architecture of a Call Control server can typically choose from several mechanisms to deliver call event notifications. Sequential delivery of call event notifications to all registered users works well for small numbers of endpoints, but as the number of terminals grows the latency between the notification to the first terminal and the last terminal grows linearly. Alternatively, concurrent delivery of call event notifications to all registered users uses multiple threads of processing in the Call Control server to deliver the call notifications more efficiently than a sequential delivery. However, the number of threads that can be assigned to this task are limited by system resources and the maximum throughput of messages onto the network. As the number of registered terminals exceeds the number of available threads to deliver notifications the latency between the first and last notification will grow. This method leads to a "best effort" distribution of events.

Another variant for delivery of notifications is to use a multicast protocol, where all registered terminals are subscribed to a multicast group to receive the updates. This is a particularly efficient delivery mechanism as the Call Control server only has to send one message to deliver the event to all registered terminals. However, multicast protocols complicate the network design and make providing a resilient solution more difficult, especially if the scope of delivery is expected to extend to a WAN (wide area network) deployment.

Another variant is to provide a Call Distribution Module that deals with a small number of terminals. By having a three-tier architecture, the central call control server would send notification to only those Call Distribution Modules who have terminals attached with interest in the Trunk/DDI which initiated the alert. Each Call Distribution Module in turn forwards the message to terminals attached to it. As there are smaller number of terminals attached to each Call Distribution Module, this helps to maintain democracy between terminals for inter and intra Call Distribution Modules. However, again this approach is not appropriate for all network architectures, and in particular there may be difficulties in allocating individual terminals to their appropriate call distribution modules in a dynamic environment as users' requirements change.

According to the invention, there is provided a method of controlling a telecommunications server for controlling a plurality of telecommunications terminals connected to a packet switched telecommunications system, wherein the server responds to call events by transmitting a notification to each of the terminals, and wherein each terminal has a set of associated notification modes by which call events of specified types are notified to the user, characterised in that:

the set of notification modes for each terminal are maintained in a store associated with the server and, for each call event, the server identifies the call event type and arranges the event notifications for the respective terminals to be processed in a sequence according to the notification modes specified for each terminal for the call event type associated with the current call event.

Another aspect of the invention provides a server for controlling a packet switching system for a telecommunications system, the server being responsive to call events to activate an event notification generator to transmit an event notification to each a plurality of telecommunications terminals connected to the system, characterised by the server being arranged, in the event of a call event, to identify the type of the call event, and to retrieve in respect of each terminal, from an associated store of terminal profiles, an event notification mode by which the event notification generator is to notify the respective terminal of call events of the type identified, and to process instructions to the event notification generator to transmit event notification alerts to the terminals in a sequence according to their respective event notification modes.

As discussed above, the call events may be call attempts received through an external network, in response to which the alerted terminals are capable of connection to the calling party in response to the call attempt. However, other call events may be the subject of alerts. The terminals to be alerted to a particular event may be selected from a larger plurality of terminals connected to the packet switched telecommunications system.

The store of user profiles may be updatable by each terminal to select an alert mode by which the event alert generator is to notify the terminal of one or more specified event types. The event types may relate to specified calling parties or predetermined classes of calling parties Preferably, each terminal has a capability to select the mode by which an event alert of a specified type is notified to the user, such selections being transmitted to the store. The server may record the sequence in which it processes the event alerts for processing for each terminal, for a given specified type, and select the order of event alerts for subsequent calls of the same type with reference to the recorded sequence. This allows terminals of equal priority to be favoured in rotation.

This prioritisation of indication for call event notification provides a method to ensure a deterministic and democratic delivery on top of any of the delivery mechanisms described above or any other delivery mechanism. This invention therefore allocates a priority order to the network terminations such that the server sends an alert message to the terminals in a predetermined sequence. The sequence may be determined according to the users' likely interest in the call, so that all users with an interest in a particular class of incoming call are alerted first. The invention allows all callers having a particular interest in a call type to be alerted as near simultaneously as possible.

If the number of user terminals in a category is still too great to allow the server to alert all users simultaneously, it may be arranged to prioritise the users in each category in rotation. Thus a priority order is allocated to groups of users and the call server delivers events to the groups in priority order, to provide a deterministic delivery of call event traffic. The maximum size of a notification group will be determined to ensure that the latency of event delivery from the first user to the last user in the group is not perceptible at the terminal (turret), and will vary from one system to another depending on the latency of event delivery, on what interval is considered acceptable or perceptible, and on how many individual priority levels can be defined. In this way it is possible to ensure the democracy of event delivery and that no user within a group will gain an advantage.

The selection of which terminal are to be prioritised may vary according to characteristics of the call, such as calling party, number dialled, etc, and may be selected using features such as a user's own action declaring an interest in calls of a particular type. This may be a positive action such as selecting a priority level from a menu, but it is preferred for the selection to be implicit, to avoid users simply selecting the highest priority for all incoming calls. For example, a user may have set some call types to ring and others to provide only a mute (visual) alert. These settings can be used to prioritise the alerts: the user will be allocated a higher priority for those types which he has set to ring. Alternatively, the system may be set up so that an individual user can only set a predetermined number of call types to be high priority.

It should be noted that the number of users in each category may vary dynamically, depending on which users are currently connected to the system. If remote and/or wireless access modes are available as well as direct fixed connections, the access mode in use by each user may also be used to determine the user's prioritisation. In the case of mobile users, prioritisation may also take into account their current location, for example if users at a particular location are likely to be better equipped to answer the call.

BRIEF DESCRIPTION OF THE DRAWINGS

An embodiment of the invention will now be described by way of example with reference to the drawings, in which.

DETAILED DESCRIPTION OF PRESENT EXAMPLE EMBODIMENTS

Some variants of the selection process are illustrated in the Figures.

In this embodiment the invention is implemented in a software component, and specifically by suitable programming of a call control server 2.

Figure 1:
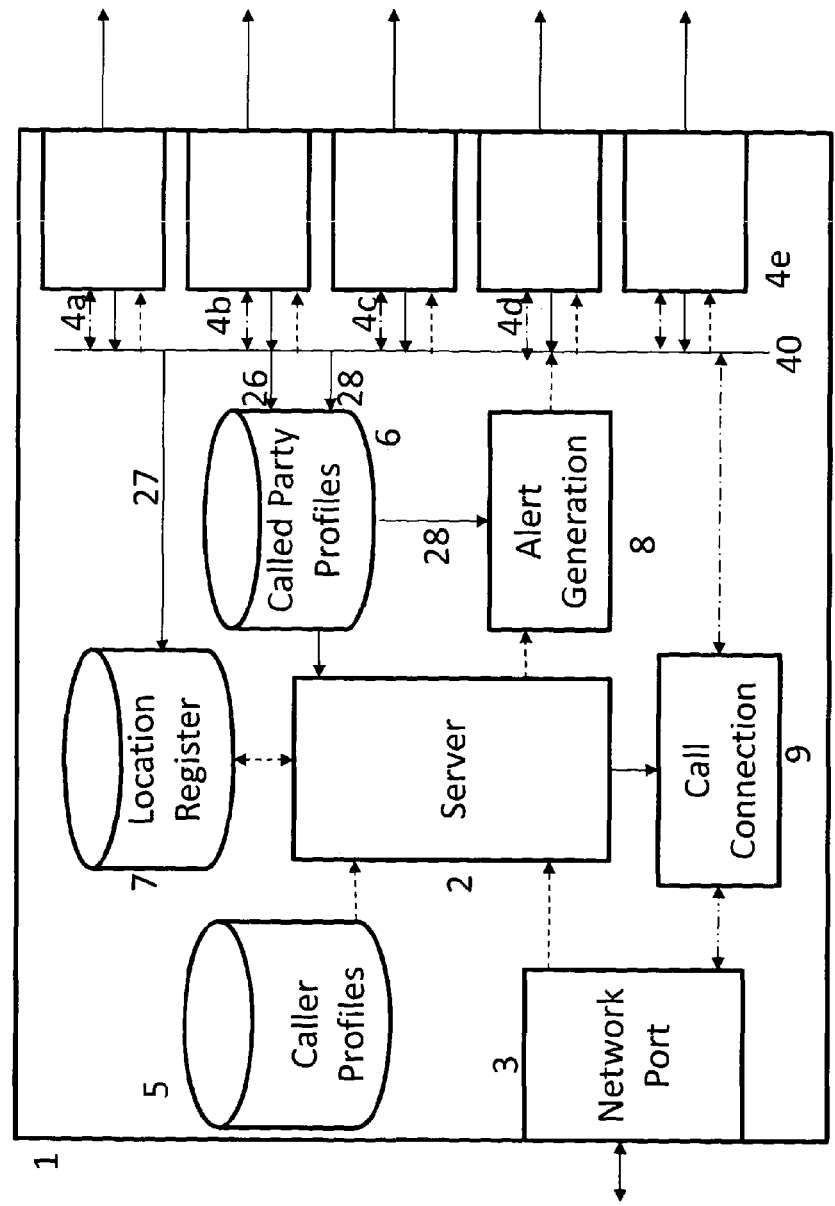
FIG. 1 is a schematic depiction of the components which co-operate in the performance of the invention
Figure 2:
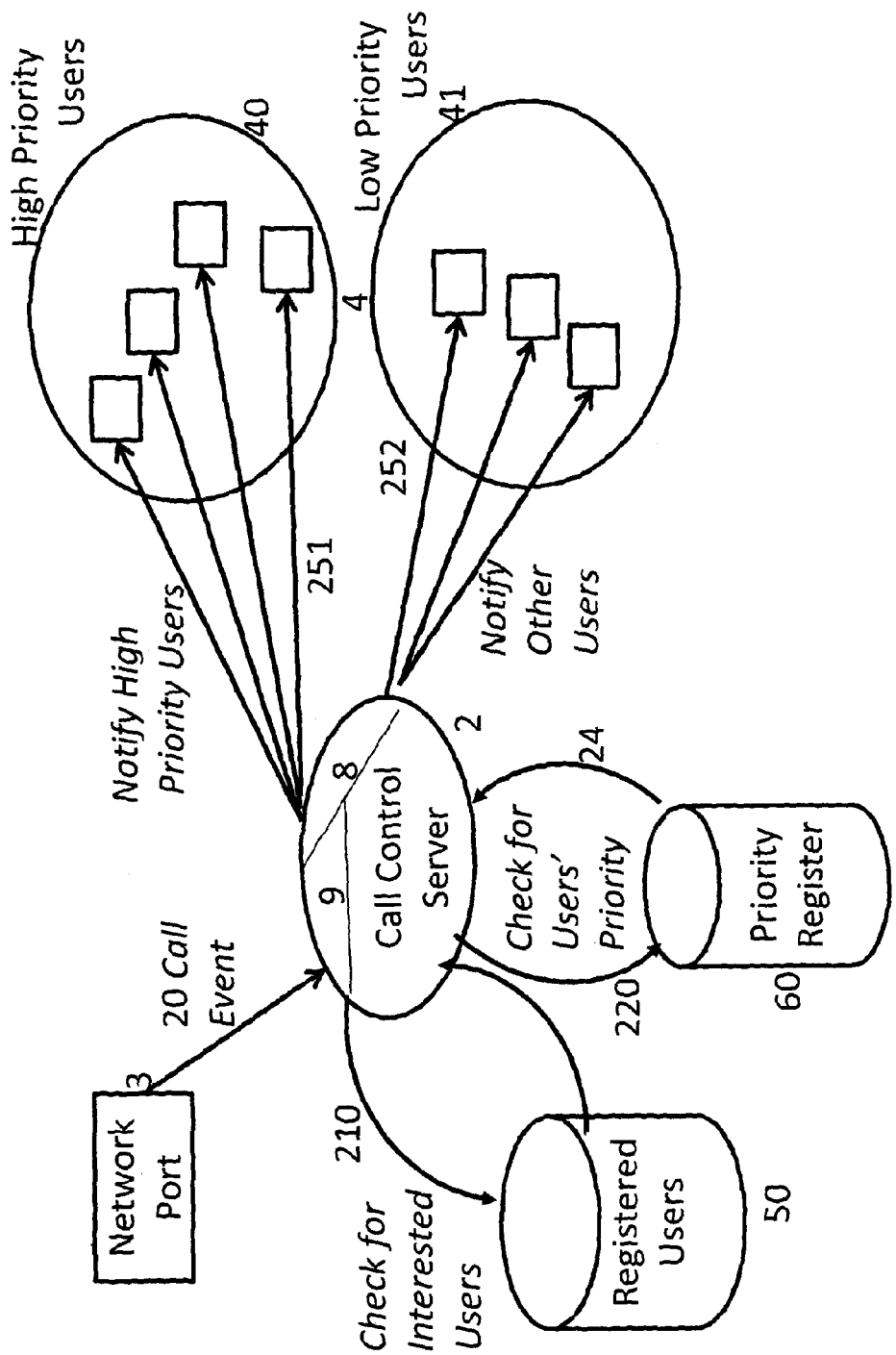
FIG. 2 is a schematic illustrating the interactions between the components when a call event occurs

FIGS. 1 and 2 depict an installation 1 having a server 2, an external port 3 for connection to a network and a plurality of local ports 4a, 4b, etc for connection to individual user terminals. The various components communicate with each other through a databus 40, although for clarity some functional connections to the server 2 are depicted separately.

Figure 3:
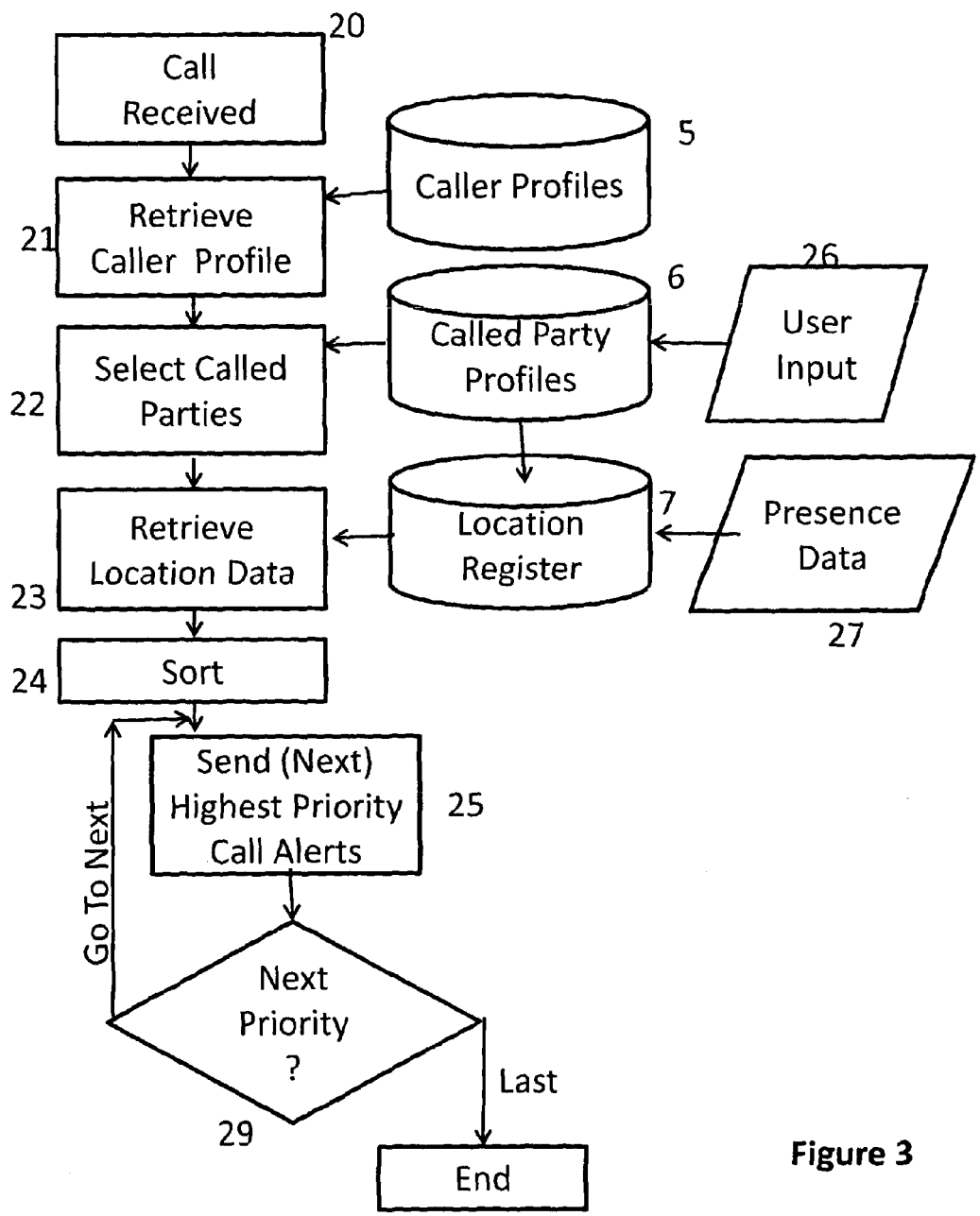
FIG. 3 is a flow chart illustrating the process by which the invention operates
Figure 4:
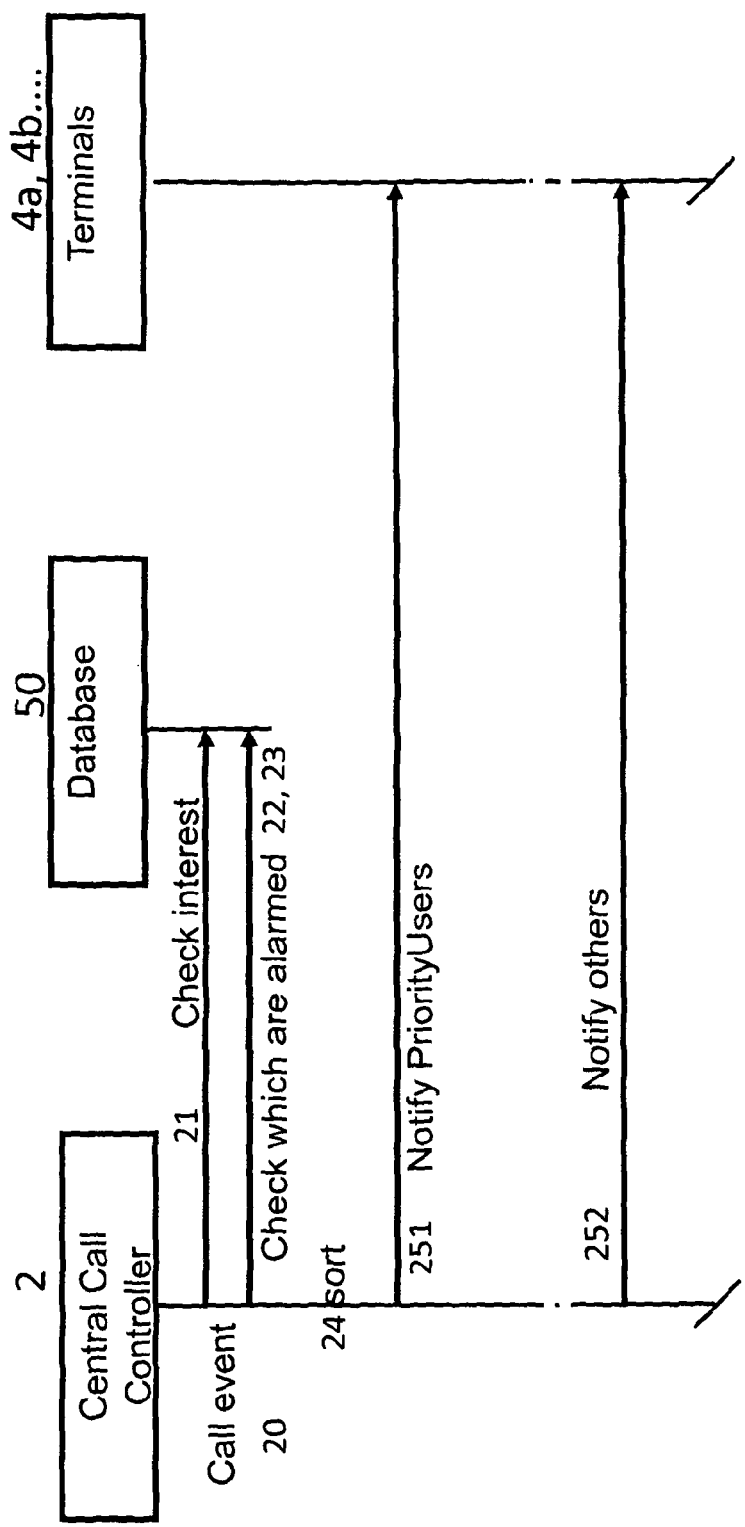
FIG. 4 is a sequence diagram further illustrating the process

Associated with the server 2 are data storage media 5, 6, 7, (50, 60). A first data storage medium 5 stores data relating to individual parties which may attempt to make an incoming call through the network port 3. Such data may include a calling line identity (CLI) call, data relating to previous calls made by that user, for example the user or user terminal that answered a previous call, or a flag set to identify the type of input each individual caller is expected to provide. A similar data set 6 stores data relating to individual users of the local system, such as individual specialisms. These profiles may be set by inputs 26 from the users themselves, through the local ports 4a, 4b etc. Together, the data stored in the caller profile and called party profile stores 5, 6 can be used by the server 2 to determine to which users it is most appropriate to route an individual incoming call. FIGS. 1 and 3 indicate a variant in which caller data is stored in a first database 5 for retrieval by the server 2 which then selects users from a second database 6 having data matching that retrieved, as modified by location data in a third database 7. In FIGS. 2 and 4 the database 50 holds a concordance between calling and called parties, and those matching the concordance are then prioritised according to a ranking stored in the second database 60.

As individual users may not be permanently connected to an individual terminal, and thus to an individual port 4a, 4b etc, an additional register 7 is depicted to provide presence and location data on each individual users. Location updates 27 are received from user terminals through the ports 4a, 4b etc. Essentially this location database provides a dynamic match between an individual's user identity and an individual port or, if the user is offline, records that the user is currently unavailable. This allows users who are on line to be identified, and calls to be routed to them.

The data in the location register 7 may also be modified (28, FIG. 2) by data in the called party profile 6, for example to determine what divert instructions should be applied when the called party is not present on the system, or whether prioritisation of called parties should be made dependant on location.

The server controls an alert generation system 8 which transmits an alert to each port 4a, 4b, 4c when an incoming call is received. When a user answers a call, the server 2 enables a call connection 9 to be set up between the respective local port 4a, etc and the network port 3.

In existing systems a problem arises because of the way in which data processing systems operate. In particular, data is typically carried over a data bus 40 and therefore must be transmitted sequentially rather than simultaneously. This means that the individual terminals currently associated with each port 4a, 4b, 4c etc will not all receive an alert simultaneously. Similarly, some of the ports 4a, 4b, 4c etc may provide Ethernet connection whilst other may be wireless. Such differences may result in differences in arrival time of signals generated by the alert generation system 8.

In order to ameliorate the effects of these differences, the server is arranged to transmit the alerts in a sequence dependant on the data stored in the databases 5, 6, 7. The acquisition of this data is illustrated schematically in FIG. 1. As already discussed, the called party profile 6 is maintained by data input 26 by, or on behalf of, the user. Such data may include specific preferences for calls from particular sources, or implicit preferences made by reference to the way a user has requested he be alerted to such calls—for example a user may set up different kinds of alerts be generated at the terminal in response to different callers, for example, audible or silent (visual-only). These details 28 are sent to the server and used to control the alert signal 8 when a call attempt is made.

The profile store 5 maintains a data list of call event types, and the users interested in such call events, and a priority register 6 identifies the order in which those users are to be alerted. The priority register 6 can be configured explicitly by an administrator or by individual users 4a, 4b, . . . of the system. To provide explicit configuration a priority must be assigned for each User against each Trunk or DDI he has access to on his terminal (turret). This can either be assigned by an administrator or by the users themselves. However it must be noted that users are unlikely to assign themselves to a low priority group unless incentivised to do so, for example by limiting the number of high priority groups they are allowed to select.

Many telephone systems already contain several properties within their configuration and operation that would allow the forming of implicit priority groups. Such implicit configuration of priorities utilises other properties of the system to form the groups for prioritised indication. These properties may be taken in isolation or in combination to form the prioritisation groups. For example, in a typical trading room environment, a common profile is configured for each user group, containing all the Trunks and DDI's used by that user group. However, typically a user is only interested in answering calls from a small subset of these Trunks and DDI's. The user normally alarms the Trunks and DDI's that are of importance such that when there is an incoming call his terminal (turret) plays an audible alarm to alert his attention to the ringing line. Other users not interested in calls on this Trunk or DDI will not alarm them. This provides a natural means of prioritising the notification by allocating all users that have alarmed a Trunk or DDI to the high priority group. A more detailed prioritisation may be afforded by allocating priority by Key Position. On the Users terminal (turret) the Trunks and DDI's are arranged on a scrollable page of keys, in an order selectable by the user. The relative position of these keys to each other can give an indication of the importance of that Trunk or DDI to the User and hence a priority for call event notification. The called party profile system can therefore be configured such that each user can only specify a predetermined number of high priority caller profiles. For example, a user turret may have a fixed number of "favoured caller" switches which allow a user to specify calling numbers which will give a special alert tone. These can be configured to be associated with the user's highest priority in the called party profile database 6.

Within user groups there are often hierarchies such as "Head of Desk", "Senior Trader", "Junior Trader", "Research Analyst", etc. A ranking of these groups can be used to form a role based prioritisation policy for call notification.

A further categorisation can be by user location. For instance the workspace may be split into several floors and zones. The users with a interest in a specific set of Trunks and DDI's would typically be co-located, mapping their location to the Trunks and DDI's used by a specific user Group can then provide a location based policy for call notification. The telephone system 2 maintains a register of each of the terminal's physical locations, for emergency call, network maintenance, switching at the physical level, and other purposes. The physical location of a user is given by the identity of the terminal to which he is currently logged on, recorded in the location register 7 in response to inputs 27 received from the ports 4a, 4b etc, and the physical location of that terminal. This can give an indication of the priority for a specific Trunk or DDI.

The mechanism for prioritising notification will now be discussed, with particular reference to new incoming calls, but it will be recognised by those skilled in the art that the same principles can be applied for any call state changes on that Trunk or DDI. The process is illustrated in FIGS. 3 and 4

On receipt of a call at a port of the network gateway 3, (step 20) the network Gateway indicates the incoming call to the Call Control server 2. In the embodiment of FIGS. 1 and 3 The call Control server interrogates its database 6 of registered users to determine a list of the terminals (turrets)

for users that have registered interest in the DDI line from which the call originates, or other data identifying the call type and retrieves a profile from the caller database 5 (step 21). A default profile is held for any calling lines not having a specific profile. The call Control server 2 interrogates its priority register 6 to select the parties to be alerted (step 22) by retrieving the called party profiles 6 and, organises the registered users into groups according to what priority, if any, each party has set for the current call event. The priority set for any given party may be modified following a check on its location data 7 (step 23).

In the variant of FIG. 4, the call control server checks a concordance 50 (step 210) for users who have registered an interest in the call alert type and allocates them to groups (step 220) according to the rankings stored in the priority register 60.

Having retrieved all the relevant data, the server 2 then determines the sequence in which the users 4*a*, 4*b*, etc are to be alerted to the incoming call (step 24), and causes the alert generator 8 to transmit call alerts to each port 4*a*, 4*b*, etc, and thus to the respective terminals connected to those ports, in sequence (step 25), starting with the highest priority terminal (step 251) and then to the next highest priority terminal (252).

As depicted in FIG. 2, the alert generator 8 is capable of generating alerts for a group of several terminals substantially simultaneously (that is to say, the difference between first and last is not noticeable). Terminals are allocated to one of a plurality of groups (40, 41) of terminals according to their priority, each group of terminals then being alerted in turn.

To avoid a group becoming too large, it may be split into smaller groups, with relative priority within those groups.

Unless conferencing or other multi-way calling is enabled, the alert process 25 is terminated 29 when all groups have been notified. If the event alert is actioned—for example an incoming call has been answered before some parties have received the alert, a separate notification is sent to all interested terminals. The call connection processor 9 then establishes a voice link (typically RTP or a similar packet switched voice protocol) between the network port 3 and the local port 4*a*, 4*b*, etc which answered the call.

What is claimed is:

1. A method of controlling a telecommunications server for controlling a plurality of telecommunications terminals connected to a packet switched telecommunications system, wherein the server responds to an incoming call event by transmitting notifications to each of the terminals so as to initiate simultaneous call alerts at each terminal, and wherein each terminal has a set of associated notification modes by which call events of specified types are notified to the user,
    characterised in that:
    the set of notification modes for each terminal are maintained in a store associated with the server and, for each call event, the server identifies the call event type and processes the event notifications for the respective terminals in a sequence according to the notification modes specified for the respective terminals for the call event type identified by the server.

2. A method according to claim 1, wherein the call events are call attempts received through an external network such that any one of the alerted terminals is capable of connection to the calling party in response to the call attempt.

3. A method according to claim 2, wherein the server records the sequence in which it processes the event notifications for processing for each terminal, for a given specified type, and selects the order of event notifications for subsequent calls of the same type with reference to the recorded sequence.

4. A method according to claim 1 wherein the specified event types relate to incoming call attempts from specified calling parties or predetermined classes of calling parties.

5. A method according to claim 1, wherein the terminals to which event notifications are transmitted so as to initiate simultaneous call alerts are selected from a larger plurality of terminals connected to the packet switched telecommunications system.

6. A method according to claim 1, wherein the plurality of telecommunications terminals includes a first group of terminals and a second group of terminals, the first group of terminals having a higher priority than the second group of terminals, the call alerts in each of the terminals in the first group are initiated simultaneously, and the call alerts in each of the terminals in the second group are initiated simultaneously.

7. A server for controlling a packet switching system for a telecommunications system, the server being responsive to incoming call events to activate an event notification generator to transmit an event notification to each of a plurality of telecommunications terminals connected to the system, so as to initiate simultaneous call alerts at each terminal,
    characterised by: the server being arranged, in the event of a call event, to identify the type of the call event, and to retrieve in respect of each terminal, from an associated store of terminal profiles, an event notification mode by which the event notification generator is to notify the respective terminal of call events of the type identified, and to process instructions to the event notification generator to transmit the event notification alerts to the terminals in a sequence according to their respective event notification modes.

8. A server according to claim 7, wherein the call events are call attempts received through an external network from calling parties, and the server is responsive to the terminals to connect any one of the alerted terminals to the calling party in response to the call attempt.

9. A server according to claim 8, wherein the event types relate to incoming call attempts from specified calling parties or predetermined classes of calling parties.

10. A server according to claim 8, arranged to store a record of the sequence in which it processes the event notifications for processing for each terminal, for a given specified call type, and to select the sequence in which terminals receive event notifications for subsequent calls of the same type with reference to the recorded previous sequences.

11. A server according to claim 8, wherein the plurality of telecommunications terminals includes a first group of terminals and a second group of terminals, the first group of terminals having a higher priority than the second group of terminals, the call alerts in each of the terminals in the first group are initiated simultaneously, and the call alerts in each of the terminals in the second group are initiated simultaneously.

* * * * *